US009165697B2

(12) United States Patent
Iwasaki et al.

(10) Patent No.: US 9,165,697 B2
(45) Date of Patent: Oct. 20, 2015

(54) PEROXIDE CROSSLINKED RESIN COMPOSITION AND ELECTRIC WIRE AND CABLE USING SAME

(71) Applicant: Hitachi Metals, Ltd., Tokyo (JP)

(72) Inventors: Makoto Iwasaki, Hitachi (JP); Hitoshi Kimura, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 106 days.

(21) Appl. No.: 14/084,391

(22) Filed: Nov. 19, 2013

(65) Prior Publication Data

US 2014/0138117 A1 May 22, 2014

(30) Foreign Application Priority Data

Nov. 20, 2012 (JP) ................................ 2012-254743

(51) Int. Cl.
*C08J 3/22* (2006.01)
*C08K 3/34* (2006.01)
*H01B 3/30* (2006.01)
*H01B 3/44* (2006.01)

(52) U.S. Cl.
CPC . *H01B 3/30* (2013.01); *H01B 3/441* (2013.01)

(58) Field of Classification Search
CPC ........................................................ H01B 3/30
USPC ........................................................ 524/525
See application file for complete search history.

(56) References Cited

U.S. PATENT DOCUMENTS

2010/0298456 A1* 11/2010 Nakajima et al. ............. 521/134
2014/0138117 A1 5/2014 Iwasaki et al.

FOREIGN PATENT DOCUMENTS

EP 2 117 010 A1 11/2009
JP 5660107 B2 1/2015
WO WO 2008/108355 A1 9/2008

OTHER PUBLICATIONS

Japanese Office Action dated Feb. 13, 2015 with an English translation thereof.

* cited by examiner

*Primary Examiner* — Hui Chin
(74) *Attorney, Agent, or Firm* — McGinn IP Law Group, PLLC

(57) ABSTRACT

A peroxide crosslinked resin composition includes a base polymer (A) including 50 to 90% by mass of a first copolymer component (a1) including one of or a mixture of two or more first ethylene α-olefin copolymers having a density of 0.864 to 0.890 g/cm$^3$, a melt flow rate (MFR) of 1 to 5 g/10 min, and a melting point of not higher than 90 degrees Celsius, and 10 to 50% by mass of a second copolymer component (a2) including one of or a mixture of two or more second ethylene α-olefin copolymers having a melt flow rate (MFR) of not smaller than 30 g/10 min, and a melting point of 55 to 80 degrees Celsius, an inorganic filler (B) added in a ratio of from 80 parts to 150 parts by mass with respect to 100 parts by mass of the base polymer (A), and a peroxide crosslinker (C).

4 Claims, 1 Drawing Sheet

PEROXIDE CROSSLINKED RESIN COMPOSITION AND ELECTRIC WIRE AND CABLE USING SAME

The present application is based on Japanese patent application No. 2012-254743 filed on Nov. 20, 2012, the entire contents of which are incorporated herein by reference.

BACKGROUND OF THE INVENTION

1. Field of the Invention

This invention relates to a peroxide crosslinked resin composition and electric wire and cable using the peroxide crosslinked resin composition. More particularly, the invention relates to a peroxide crosslinked resin composition excellent in blocking resistance in pellet form when in storage at ordinary temperature, capable of being extrusion molded for an organic peroxide including material, good in electrical properties when submerged in water, and capable of suppressing the emission of toxic gas when burnt. The invention also relates to an electric wire and a cable using the peroxide crosslinked resin composition.

2. Description of the Related Art

Awareness of environmental issues has been increasing worldwide, and there has been a demand for a halogen-free material, which is free from emission of halogen gas when burnt, and which suppresses carbon monoxide, which is one of toxic gases.

Meanwhile, electric wires or cables, which are wired in railway vehicles, automobiles, robots, etc., are required to have a high electrical insulation property, depending on an environment used. For example, when the electric wires or cables are exposed to water such as rainwater, seawater, etc., or when the electric wires or cables are used in a high temperature and high humidity environment, it is known that a non-polar polymer having no hydrophilicity is applied thereto (see, e.g. WO2008/108355).

Now, in general, rubber material is excellent in insulating performance. A molded product using a rubber material is produced through a crosslinking process with the addition of a peroxide. For example, when an electric wire and cable is fabricated, a rubber material is molded into the shape of the electric wire and cable with a temperature controlled extruder at a temperature at which no decomposition of an organic peroxide in the rubber material occurs, and subsequently is passed through a vulcanizing tube, resulting in the crosslinked electric wire and cable.

In order to produce a product which is good in electrical properties when submerged in water, it is preferable to singly use a nonpolar polymer including no filler, but when the nonpolar polymer is burnt, the amount of carbon monoxide emission is large, and response to crosslinking problems is insufficient. Further, since many of rubber materials generally have no melting point, and the rubbers adhere together at ordinary temperature and cause blocking, special equipment is required for processing into a ribbon shape, applying an anti-blocking agent and putting into a molding machine such as an extruder or the like.

A pellet shape may be proposed as a shape that is easy to mold in extrusion molding. When the rubber material is processed into pellets, due to an increase in contact area between the materials in comparison to the ribbons, blocking prominently manifests and molding becomes difficult. A material that can be molded into pellet form is generally a material having crystallinity, and many thereof, such as polyethylene or polypropylene, have a melting point of not lower than 100 degrees Celsius. When this material is extrusion molded with the addition of an organic peroxide, it may be scorched (or prematurely vulcanized), and therefore is constrained by molding conditions. Among the non-polar rubbers, an ethylene α-olefin copolymer can be a material having a melting point of not higher than 100 degrees Celsius, but has had the drawback of partial blocking when bagged, stacked and stored in a warehouse or the like for a long period of time.

SUMMARY OF THE INVENTION

In view of the above problem, it is an object of the present invention to provide a peroxide crosslinked resin composition, which is excellent in blocking resistance in pellet form when in storage at ordinary temperature, unconstrained by molding conditions even when using a raw material including an organic peroxide, good in electrical properties when submerged in water, and capable of suppressing the emission of toxic gas when burnt. It is also an object of the present invention to provide an electric wire and a cable using the peroxide crosslinked resin composition.

To achieve the above objects, according to the present invention, a peroxide crosslinked resin composition below as well as an electric wire and a cable below using this peroxide crosslinked resin composition are provided.

(1) According to a first embodiment of the invention, a peroxide crosslinked resin composition includes:

- a base polymer (A) including 50 to 90% by mass of a first copolymer component (a1) comprising one of or a mixture of two or more first ethylene α-olefin copolymers having a density of 0.864 to 0,890 g/cm$^3$, a melt flow rate of 1 to 5 g/10 min, and a melting point of not higher than 90 degrees Celsius, and 10 to 50% by mass of a second copolymer component (a2) comprising one of or a mixture of two or more second ethylene α-olefin copolymers having a melt flow rate of not smaller than 30 g/10 min, and a melting point of 55 to 80 degrees Celsius;
- an inorganic filler (B) added in a ratio of from 80 parts to 150 parts by mass with respect to 100 parts by mass of the base polymer (A); and
- a peroxide crosslinker (C).

In the first embodiment, the following modifications and changes can be made.

The inorganic filler (B) comprises a mean grain diameter of 0.8 to 2.5 μm.

(2) According to a second embodiment of the invention, an electric wire comprises:

- a conductor; and
- an insulator formed around an outer periphery of the conductor by coating with the above peroxide crosslinked resin composition.

(3) According to a third embodiment of the invention, a cable comprises the above electric wire.

(Points of the Invention)

According to the present invention, it is possible to provide the peroxide crosslinked resin composition, which is excellent in blocking resistance in pellet form when in storage at ordinary temperature, unconstrained by molding conditions even when using a raw material including an organic peroxide, good in electrical properties when submerged in water, and capable of suppressing the emission of toxic gas when burnt. It is also possible to provide the electric wire and the cable using the peroxide crosslinked resin composition.

BRIEF DESCRIPTION OF THE DRAWINGS

The exemplary embodiments according to the invention will be explained below referring to the drawings, wherein.

DETAILED DESCRIPTION OF THE EMBODIMENTS

Summary of the Embodiment

Figure 1:
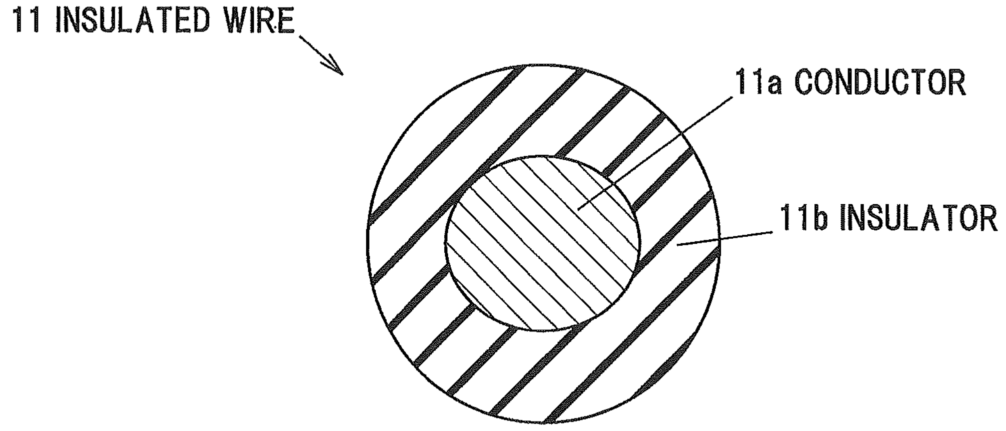
FIG. 1 is a cross sectional view schematically showing an insulated wire in an embodiment according to the present invention.

A peroxide crosslinked resin composition in this embodiment includes a base polymer (A), an inorganic filler (B), and a peroxide crosslinker (C). In the peroxide crosslinked resin composition, the base polymer (A) includes 50 to 90% by mass of a first copolymer component (a1) comprising one of or a mixture of two or more first ethylene α-olefin copolymers having a density of 0.864 to 0.890 g/cm$^3$, a melt flow rate (MFR) of 1 to 5 g/10 min, and a melting point of not higher than 90 degrees Celsius, and 10 to 50% by mass of a second copolymer component (a2) comprising one of or a mixture of two or more second ethylene α-olefin copolymers having a melt flow rate (MFR) of not smaller than 30 g/10 min, and a melting point of 55 to 80 degrees Celsius. The inorganic filler (B) is added in a ratio of from 80 parts to 150 parts by mass with respect to 100 parts by mass of the base polymer (A).

An electric wire in this embodiment includes a conductor, and an insulator formed around an outer periphery of the conductor by coating with the above mentioned peroxide crosslinked resin composition.

Further, a cable in this embodiment includes the above mentioned electric wire.

1. Peroxide Crosslinked Resin Composition

A peroxide crosslinked resin composition in this embodiment includes a base polymer (A) including 50 to 90% by mass of a first copolymer component (a1) comprising one of or a mixture of two or more first ethylene α-olefin copolymers having a density of 0.864 to 0.890 g/cm$^3$, a melt flow rate (MFR) of 1 to 5 g/10 min, and a melting point of not higher than 90 degrees Celsius, and 10 to 50% by mass of a second copolymer component (a2) comprising one of or a mixture of two or more second ethylene α-olefin copolymers having a melt flow rate (MFR) of not smaller than 30 g/10 min, and a melting point of 55 to 80 degrees Celsius, an inorganic filler (B) added in a ratio of from 80 parts to 150 parts by mass with respect to 100 parts by mass of the base polymer (A), and a peroxide crosslinker (C).

(1) Base Polymer (A)

The base polymer (A) used in this embodiment is configured to include the first copolymer component (a1) comprising one of or a mixture of two or more first ethylene α-olefin copolymers having a predetermined property, and the second copolymer component (a2) comprising one of or a mixture of two or more second ethylene α-olefin copolymers having a predetermined property.

As an example of the first ethylene α-olefin copolymer and the second ethylene α-olefin copolymer constituting the first copolymer component (a1) and the second copolymer component (a2) used in the present embodiment, there can be given a copolymer of an α-olefin with 3 to 12 carbon atoms and ethylene. The α-olefin may be linear or branched. As the α-olefin, e.g., propylene, 1-butene, 1-pentene, 1-hexene, 4-methyl-pentene, 1-heptene, 1-octene, etc. may be used. A catalyst used in a method for producing the ethylene α-olefin copolymer is not particularly limited, but may be any catalyst for good progression of copolymerization of ethylene and another α-olefin. As the catalyst, e.g., transition metal catalysts such as vanadium based catalysts, titanium based catalysts, metallocene compounds, organometallic complex based catalysts and the like may be used. Any thereof may be applied, but it is exemplary to use an α-olefin with 4 to 6 carbon atoms, which is low in melting point and good in flexibility, and a metallocene compound catalyst.

The first copolymer component (a1) is composed essentially of one of or a mixture of two or more first ethylene α-olefin copolymers having a density of 0.864 to 0.890 g/cm$^3$, a melt flow rate (MFR) of 1 to 5 g/10 min, and a melting point of not higher than 90 degrees Celsius. If the density of the first ethylene α-olefin copolymer (first copolymer component (a1)) is smaller than 0.864 g/cm$^3$, no sufficient mechanical strength is likely to be achieved, while if the density of the first ethylene α-olefin copolymer (first copolymer component (a1)) exceeds 0.890 g/cm$^3$, no flexibility can be achieved. Further, if the MFR is smaller than 1 g/10 min, lowering in delivery capacity of extrusion molding occurs, leading to productivity lowering. If the MFR exceeds 5 g/10 minutes, no sufficient mechanical strength can be achieved due to the molecular weight being low. Furthermore, if the melting point exceeds 90 degrees Celsius, it is necessary to increase the extrusion molding temperature. If the temperature is high, the decomposition of the peroxide is accelerated, leading to scorching and extruded appearance worsening.

The second copolymer component (a2) is composed essentially of one of or a mixture of two or more second ethylene α-olefin copolymers having a melt flow rate (MFR) of not smaller than 30 g/10 min, and a melting point of 55 to 80 degrees Celsius. If the MFR of the second ethylene α-olefin copolymer (second copolymer component (a2)) is smaller than 30 g/10 min, lowering in delivery capacity of extrusion molding occurs, leading to productivity lowering. If the melting point is lower than 55 degrees Celsius, the resulting resin composition blocking occurs, leading to productivity lowering, while if the melting point exceeds 80 degrees Celsius, scorching tends to occur due to the extrusion molding temperature being high, leading to extruded appearance worsening.

In the base polymer (A), 50 to 90% by mass of the first copolymer component (a1) and 10 to 50% by mass of the second copolymer component (a2) are compounded together. If the first copolymer component (a1) is smaller than 50% by mass, no sufficient mechanical strength can be achieved, while if the first copolymer component (a1) exceeds 90% by mass, no flexibility can be achieved.

(2) Inorganic Filler (B)

The inorganic filler (B) used in the present embodiment is added in a ratio of from 80 parts to 150 parts by mass with respect to 100 parts by mass of the base polymer (A). If the amount of the inorganic filler (B) is smaller than 80 parts by mass, much carbon monoxide is caused by burning, and is not suitable for use. If the amount of the inorganic filler (B) exceeds 150 parts by mass, no flexibility can be achieved.

The mean grain diameter of the inorganic filler (B) is preferably 0.8 to 2.5 μm. If the mean grain diameter of the inorganic filler (B) is smaller than 0.8 μm, the surface area in contact with the base polymer (A) is large, and water percolation is caused by submergence in water, being likely to lower the electrical properties. If the mean grain diameter of the inorganic filler (B) exceeds 2.5 μm, the mechanical strength is likely to lower.

As the inorganic filler (B) used in the present embodiment, e.g., silicate salts, such as kaolinite, kaolin clay, calcined clay, talc, mica, wollastonite, pyrophyllite, etc., oxides, such as silica, alumina, zinc oxide, titanium oxide, calcium oxide, magnesium oxide, etc., carbonates, such as calcium carbonate, zinc carbonate, barium carbonate, etc., hydroxides, such as calcium hydroxide, magnesium hydroxide, aluminum hydroxide, and the like may be used. They may be used singly or by mixing two or more thereof. Among them, the calcined clay and the talc are exemplary because of including no carbon, being hydrophobic, therefore causing little carbon monoxide, and exhibiting high electrical properties. Also, these inorganic fillers (B) are exemplarily surface treated with silane or the like to consolidate the adhesion to the base polymer (A), and thereby manifest a higher electrically insulating performance.

If desired, a crosslinking aid, a flame retardant aid, a UV absorber, a light stabilizer, a softener, a lubricant, a colorant, a reinforcing agent, a surfactant, a plasticizer a metal chelating agent, a blowing agent, a compatibilizer, a processing aid, a stabilizer and the like may be added to the resin composition composed essentially of these materials.

(3) Crosslinker (C)

The peroxide crosslinked resin composition in the present embodiment includes the crosslinker (C) and is crosslinked with a peroxide As the peroxide crosslinking, a versatile chemical crosslinking with an organic peroxide may be used. As the crosslinker (C), e.g., hydroperoxide, diacyl peroxide, peroxy ester, dialkyl peroxide, ketone peroxide, peroxy ketal, peroxy dicarbonate, peroxy monocarbonate and the like may be used. Further, the amount of the crosslinker (C) to be added is added preferably in a ratio of, e.g., from 0.1 parts to 5 parts by mass with respect to 100 parts by mass of the base polymer (A).

2. Electric Wire and Cable

As shown in FIG. 1, an electric wire in the present embodiment is configured as an electrically insulated wire (insulated wire) 11, e.g., and includes a conductor 11*a* that is formed of a versatile tinned annealed stranded copper wire, and an insulator 11*b* that is formed around an outer periphery of the conductor 11*a* by coating with the peroxide crosslinked resin composition described above. In FIG. 1, the insulator 11*b* of a single layer structure is used, but it may be of a multilayer structure. If desired, a separator, a braid or the like may also be applied thereto. In the multilayer structure, a material to be applied to the outermost layer is not particularly limited.

Figure 2:
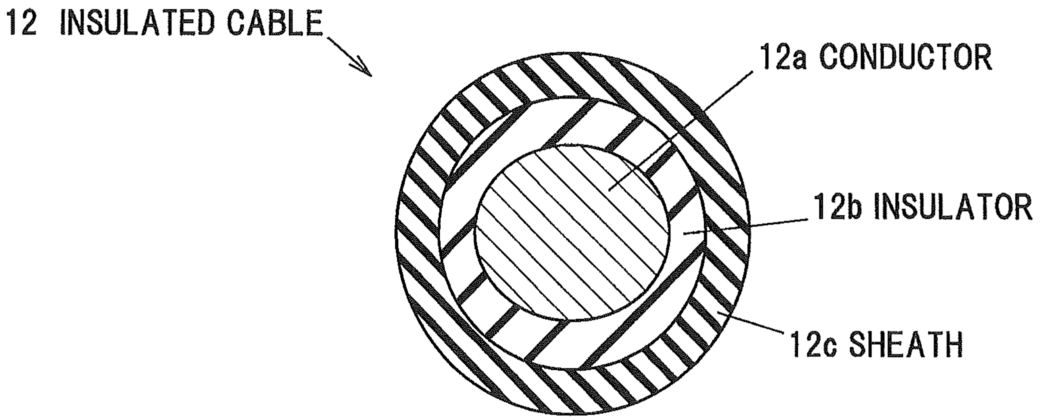
FIG. 2 is a cross sectional view schematically showing a cable in an embodiment according to the present invention.

Further, as shown in FIG. 2, a cable 12 in the present embodiment includes a conductor 12*a* and an insulator 12*b* as the above described electric wire (i.e., the electric wire 11 (the conductor 11*a* and the insulator 11*b*) shown in FIG. 1), and further includes a sheath 12*c*. Specifically, the cable 12 in the present embodiment is configured to include, e.g., one to three electric wires (the case of one wire shown in FIG. 2) with the conductor 12*a* that is formed of, e.g., a tinned annealed stranded copper wire or the like, and the insulator 12*b* that is formed around an outer periphery of the conductor 12*a* by coating with the peroxide crosslinked resin composition described above, a filler such as paper or the like in the presence of the plurality of electric wires that is twisted together with the plurality of electric wires, a binder tape that is wound therearound, and a sheath 12*c* that is formed by covering with a versatile material as an outermost layer.

EXAMPLES

The peroxide crosslinked resin composition and the electric wire and cable according to the present invention will more specifically be described below by way of Examples. In addition, the present invention is in no way limited by the following Examples.

Example 1

There was prepared a mixture of: as the first ethylene α-olefin copolymer constituting the first copolymer component (a1) of the base polymer (A), 90 parts by mass (equivalent to 90% by mass in the base polymer (A)) of ethylene α-olefin copolymer (density (ρ): 0.870 $g/cm^3$, melt flow rate (MFR): 1.0 g/10 minutes, melting point (Tm): 64 degrees Celsius) (DuPont Dow Elastomer, trade name: ENGAGE (trademark) 8100); as the second ethylene α-olefin copolymer constituting the second copolymer component (a2), 10 parts by mass (equivalent to 10% by mass in the base polymer (A)) of ethylene α-olefin copolymer (density (ρ): 0.870 $g/cm^3$, melt flow rate (MFR): 35 g/10 minutes, melting point (Tm): 55 degrees Celsius) (Mitsui Chemicals, Inc., trade name: TAFMER (trademark) A-1070S); as the inorganic filler (B), 80 parts by mass (equivalent to 80 parts by mass with respect to 100 parts by mass of the base polymer (A)) of calcined clay (mean grain size: 0.8 μm) (Hayashi Kasei Co., Ltd., trade name: Translink (trademark) 77); and, further, as the crosslinker (C), 1.5 parts by mass of organic peroxide (α,α'-di(t-butylperoxy)diisopropyl benzene) (NOF Corporation, trade name: PERBUTYL (trademark) P). The mixture thereof was kneaded at a set temperature of 50 degrees Celsius in a 25 L kneader, and after temperature rising to 150 degrees Celsius by self-heating, was molded into pellet form, resulting in a peroxide crosslinked resin composition.

Examples 2 to 15

A peroxide crosslinked resin composition was produced in the same manner as in Example 1, except that the types and mixed amounts of the base polymer (A) (the first copolymer component (a1) and the second copolymer component (a2)) and the inorganic filler (B) in Example 1 were changed to those shown in Table 1.

TABLE 1

| | | Example | | | | | | | | | | | | | | | |
|---|---|---|---|---|---|---|---|---|---|---|---|---|---|---|---|---|---|
| Item | Example | 1 | 2 | 3 | 4 | 5 | 6 | 7 | 8 | 9 | 10 | 11 | 12 | 13 | 14 | 15 | 16 |
| First copolymer component (a1) | Ethylene-α-olefin (ρ: 0.864, MFR: 3.6, Tm: <50)[1)] | | | | | | 50 | | | | | 30 | 30 | 30 | 30 | 30 | 30 |
| | Ethylene-α-olefin (ρ: 0.870, MFR: 1.2, Tm: 55)[2)] | | | | | | | | | | 50 | 60 | 60 | 60 | 60 | 60 | 60 |
| | Ethylene-α-olefin (ρ: 0.890, MFR: 3.2, Tm: 75)[3)] | | | | | 50 | | | | | | | | | | | |
| | Ethylene-α-olefin (ρ: 0.870, MFR: 1.0, Tm: 64)[4)] | 90 | 90 | 90 | 50 | | | | | 50 | | | | | | | |

TABLE 1-continued

| Item | Example | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| | Ethylene-α-olefin (ρ: 0.870, MFR: 5.0, Tm: 68)[5] | | | | | | | | 50 | | | | | | | | |
| | Ethylene-α-olefin (ρ: 0.885, MFR: 1.0, Tm: 86)[6] | | | | | | | 50 | | | | | | | | | |
| Second copolymer component (a2) | Ethylene-α-olefin (ρ: 0.880, MFR: 30, Tm: 66)[7] | | | | | | | | | 50 | | | | | | | 5 |
| | Ethylene-α-olefin (ρ: 0.870, MFR: 35, Tm: 55)[8] | 10 | 10 | 10 | 50 | | 50 | | | | 50 | 10 | 10 | 10 | 10 | 10 | 5 |
| | Ethylene-α-olefin (ρ: 0.890, MFR: 75, Tm: 79)[9] | | | | | 50 | | 50 | 50 | | | | | | | | |
| Inorganic filler (B) | Calcined clay (grain diameter: 1.4)[10] | | | | | | | | | | | | 120 | | | | |
| | Calcined clay (grain diameter: 0.8)[11] | 80 | 120 | 150 | 120 | 120 | 120 | 120 | 120 | 120 | 120 | 120 | | | | | 120 |
| | Talc (grain diameter: 1.0)[12] | | | | | | | | | | | | | 120 | | | |
| | Talc (grain diameter: 2.5)[13] | | | | | | | | | | | | | | 120 | | |
| | Calcium carbonate (grain diameter: 1.8)[14] | | | | | | | | | | | | | | | 120 | |
| Crosslinker | Organic peroxide[15] | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Ordinary temperature storability | | Good | Good | Good | Good | Good | Good | Good | Good | Good | Good | Good | Good | Good | Good | Good | Good |
| Extrudability | | Very good | Good | Good | Good | Very good | Good | Very good | Very good | Good | Good | Good | Good | Good | Good | Good | Good |
| Appearance | | Good | Good | Good | Good | Good | Good | Good | Good | Good | Good | Good | Good | Good | Good | Good | Good |
| Electrical properties | | Very good | Very good | Very good | Very good | Very good | Very good | Very good | Very good | Very good | Very good | Very good | Very good | Very good | Very good | Very good | Very good |
| Flexibility | | Very good | Very good | Very good | Very good | Very good | Very good | Very good | Very good | Very good | Very good | Very good | Very good | Very good | Very good | Very good | Very good |
| Mechanical strength | | Good | Good | Good | Good | Good | Good | Good | Good | Good | Good | Good | Good | Good | Good | Good | Good |
| Amount of carbon monoxide emission | | Good | Good | Good | Good | Good | Good | Good | Good | Good | Good | Good | Good | Good | Good | Good | Good |
| Overall rating | | Very good | Very good | Very good | Very good | Very good | Very good | Very good | Very good | Very good | Very good | Very good | Very good | Very good | Very good | Very good | Very good |

In Table 1, specifically, the following were used. The same applies to the case of Table 2 described below.

1) Mitsui Chemicals, Inc., trade name: TAFMER A-4050S

2) Mitsui Chemicals, Inc., Ltd., trade name: TAFMER A-1070S

3) Sumitomo Chemical Co., Ltd., trade name: EXCELLEN FX357

4) DuPont Dow Elastomer Corp., trade name: ENGAGE 8100

5) DuPont Dow Elastomer Corp., trade name: ENGAGE 8200

6) DuPont Dow Elastomer Corp., trade name: ENGAGE 8003

7) Sumitomo Chemical Co., Ltd., trade name: EXCELLEN FX551

8) Mitsui Chemicals, Inc., Ltd., trade name: TAFMER A-35070S

9) Sumitomo Chemical Co., Ltd., trade name: EXCELLEN FX558

10) Hayashi Kasei Co., Ltd., trade name: Translink 37

11) Hayashi Kasei Co., Ltd., trade name: Translink 77

12) Nippon Talc Co., Ltd., trade name: D-1000

13) Nippon Talc Co., Ltd., trade name: SG-95

14) BIHOKU FUNKA KOGYO CO., LTD., trade name: SOFTON 1200

15) NOF Corporation, trade name: PERBUTYL P

Comparative Examples 1 to 11

A peroxide crosslinked resin composition was produced in the same manner as in Example 1, except that the types and mixed amounts of the base polymer (A) (the first copolymer component (a1) and the second copolymer component (a2)) and the inorganic filler (B) in Example 1 were changed to those shown in Table 2.

TABLE 2

| Item | Example | Comparative example 1 | 2 | 3 | 4 | 5 | 6 | 7 | 8 | 9 | 10 | 11 |
|---|---|---|---|---|---|---|---|---|---|---|---|---|
| First copolymer component (a1) | Ethylene-α-olefin (ρ: 0.870, MFR: 1.0, Tm: 64) | 100 | 40 | 50 | 50 | | | | | | 50 | 50 |
| | Ethylene-α-olefin (ρ : 0.862, MFR: 1.2, Tm: <50) | | | | | 50 | | | | | | |
| | Ethylene-α-olefin (ρ: 0.893, MFR: 3.6, Tm: 61) | | | | | | 50 | | | | | |

TABLE 2-continued

| | | Comparative example | | | | | | | | | | |
|---|---|---|---|---|---|---|---|---|---|---|---|---|
| Item | Example | 1 | 2 | 3 | 4 | 5 | 6 | 7 | 8 | 9 | 10 | 11 |
| | Ethylene-α-olefin (ρ: 0.868, MFR: 0.5, Tm: 67) | | | | | | | 50 | | | | |
| | Ethylene-α-olefin (ρ: 0.880, MFR: 8.0, Tm: 64) | | | | | | | | 50 | | | |
| | Ethylene-α-olefin (ρ: 0.898, MFR: 3.5, Tm: 93) | | | | | | | | | 50 | | |
| Second copolymer component (a2) | Ethylene-α-olefin (ρ: 0.870, MFR: 35, Tm: 55) | | 60 | 50 | 50 | 50 | 50 | 50 | 50 | 50 | | |
| | Ethylene-α-olefin (ρ: 0.878, MFR: 16, Tm: 53) | | | | | | | | | | 50 | |
| | Ethylene-α-olefin (ρ: 0.864, MFR: 3.6, Tm: <50) | | | | | | | | | | | 50 |
| Inorganic filler (B) | Calcined clay (grain diameter: 0.8) | 120 | 120 | 70 | 160 | 120 | 120 | 120 | 120 | 120 | 120 | 120 |
| Crosslinker | Organic peroxide | 1.5 | 1.5 | 1.5 | 1.5 | 1.5 | 1.5 | 1.5 | 1.5 | 1.5 | 1.5 | 1.5 |
| Ordinary temperature storability | | Good | Good | Good | Good | Good | Good | Good | Good | Good | Poor | Poor |
| Extrudability | | Good | Good | Good | Good | Good | Good | Poor | Good | Fair | Poor | Poor |
| Appearance | | Good | Good | Good | Good | Good | Good | Unratable | Good | Poor | Unratable | Unratable |
| Electrical properties | | Good | Good | Good | Good | Good | Good | Unratable | Good | Good | Unratable | Unratable |
| Flexibility | | Poor | Good | Good | Poor | Good | Poor | Unratable | Good | Good | Unratable | Unratable |
| Mechanical strength | | Good | Poor | Good | Good | Poor | Good | Unratable | Poor | Good | Unratable | Unratable |
| Amount of carbon monoxide emission | | Good | Good | Poor | Good | Good | Good | Good | Good | Good | Good | Good |
| Overall rating | | Poor | Poor | Poor | Poor | Poor | Poor | Poor | Poor | Poor | Poor | Poor |

By using the resulting peroxide crosslinked resin composition, an insulated wire as shown in FIG. 1 was produced as follows. Namely, the combinations shown in Table 1 and Table 2 were applied to eighty tin-plated conductors each of which has a diameter of 0.40 mm as an insulator. The insulator was covered at a cylinder temperature of 100 degrees Celsius by a 4.5 inch continuous steam crosslinking extruder, so that the insulator was 0.45 mm thick. Crosslinking was performed for 3 minutes using 1.5 MPa high pressure steam.

(Rating Test)

The resulting insulated wire was subjected to the following rating test. The rated results are shown in Table 1 and Table 2.

(Ordinary Temperature Storability)

For rating of storability at ordinary temperature, the combinations shown in Table 1 were kneaded, and 20 kg of the resulting pellet was then bagged in a 420 mm×820 mm paper bag. Two of the pellets were stacked together and stored in a constant-temperature bath at 40 degrees Celsius for 240 hours, and the pellets were then discharged in a vat and checked as to whether pellet blocking has occurred. When no blocking has occurred, the ordinary temperature storability was rated as "Good," or when blocking has occurred, the ordinary temperature storability was rated as "Poor".

(Extrudability)

For rating of extrudability, when the structure of the insulated cable 12 was extruded by a 4.5 inch continuous steam crosslinking extruder, when the maximum pulling speed was not slower than 20 m/min, the extrudability was rated as "Good", when the maximum pulling speed was not slower than 1 m/min and slower than 20 m/min, the extrudability was rated as "Fair", or when no pulling could be done at all, the extrudability was rated as "Poor". Also, extruded appearance was visually checked, and was rated as "Good" when smooth, or as "Poor" when irregular.

(Electrical Properties)

For rating of electrical properties, an electrical test was implemented in compliance with EN50264-3-1 7.7 section. A direct current stability test was implemented by submersion in 3% concentration salt water at 85 degrees Celsius, and 4.5 kV and 1.5 kV minus voltage impression. When no short-circuiting occurred for 10 days, the electrical properties were rated as "Very good". When at 4.5 kV short-circuiting occurred for shorter than 10 days, and at 1.5 kV no short-circuiting occurred for 10 days, the electrical properties were rated as "good" When at 4.5 kV and 1.5 kV short-circuiting occurred for shorter than 10 days, the electrical properties were rated as "Poor".

(Flexibility)

For rating of flexibility, one end of a cable was fixed to a mount, and the other end thereof was spatially protruded by 200 mm from the mount, and the other end thereof was hung with a weight of 5 g, and the amount of deflection of the cable was measured. When the amount of deflection was smaller than 50 mm, the flexibility was rated as "Poor", when the amount of deflection was not smaller than 50 mm and smaller than 100 mm, the flexibility was rated as "Good", or when the amount of deflection was not smaller than 100 mm, the flexibility was rated as "Very good". The "Very good" and "Good" were rated as "Pass".

(Mechanical Strength)

For rating of mechanical strength, an insulator was cut and punched into a dumbbell specimen No. 6. A tensile test was implemented at a tension rate of 200 mm/min, and a gauge length of 20 mm. When the tensile strength was not smaller than 7 MPa, the mechanical strength was rated as "Good", or when the tensile strength was smaller than 7 MPa, the mechanical strength was rated as "Poor".

(Amount of Carbon Monoxide Emission)

For rating of amount of carbon monoxide emission, the amount of carbon monoxide emission was measured in compliance with EN50305, and was rated as "Good" when not more than 30 m/g, or as "Poor" when more than 30 m/g.

(Overall Rating)

For overall rating, when all of the ratings in each rating method described above were determined as "Pass", the overall rating was determined as "Very good", or when even one of the ratings other than the mechanical strength rating is determined as "Fail", the overall rating is determined as "Poor".

(Rated Results)

In Examples 1 to 10, the first copolymer component (a1) constituting the base polymer (A) is consisted of only one first ethylene α-olefin copolymer. Examples 1 to 10 were all rated as "Pass", and the overall ratings thereof were determined as "Very good" as shown in Table 1.

In Examples 11 to 15, the first copolymer component (a1) constituting the base polymer (A) is consisted of the two first ethylene α-olefin copolymers. Examples 11 to 15 were all rated as "Pass" and the overall ratings thereof were determined as "Very good" as shown in Table 1.

In Example 16, the second copolymer component (a2) constituting the base polymer (A) is consisted of the two second ethylene α-olefin copolymers. Example 16 was rated as "Pass", and the overall rating thereof was determined as "Very good" as shown in Table 1.

In Comparative example 1, as much as 100 parts by mass (corresponding to 100% by mass in the base polymer (A)) of the first copolymer component (a1) is compounded. As shown in Table 2, the flexibility rating of Comparative example 1 was rated as "Fail", and the overall rating thereof was therefore determined as "Poor".

In Comparative example 2, as small as 40 parts by mass (corresponding to 40% by mass in the base polymer (A)) of the first copolymer component (a1) is compounded. As shown in Table 2, the mechanical strength rating of Comparative example 2 was rated as "Fail", and the overall rating thereof was therefore determined as "Poor".

In Comparative example 3, the added amount of the inorganic filler (B) compounded is as small as 70 parts by mass with respect to 100 parts by mass of the base polymer (A). As shown in Table 2, the amount of carbon monoxide emission of Comparative example 3 was large, and was rated as "Fail", and the overall rating thereof was therefore determined as "Poor".

In Comparative example 4, the added amount of the inorganic filler (B) compounded is as large as 160 parts by mass with respect to 100 parts by mass of the base polymer (A). As shown in Table 2, the flexibility of Comparative example 4 was rated as "Fail", and the overall rating thereof was therefore determined as "Poor".

In Comparative example 5, the first ethylene α-olefin copolymer of the first copolymer component (a1) having a density as small as 0.862 g/cm$^3$ is compounded. As shown in Table 2, the mechanical strength of Comparative example 5 was rated as "Fail", and the overall rating thereof was therefore determined as "Poor".

In Comparative example 6, the first ethylene α-olefin copolymer of the first copolymer component (a1) having a density as large as 0.893 g/cm$^3$ is compounded. As shown in Table 2, the flexibility of Comparative example 6 was rated as "Fail", and the overall rating thereof was therefore determined as "Poor".

In Comparative example 7, the first ethylene α-olefin copolymer of the first copolymer component (a1) having an MFR as small as 0.5 g/10 minutes is compounded. As shown in Table 2, extrusion was difficult. Therefore, the appearance, electrical properties, flexibility and mechanical strength of Comparative example 7 were rated as "Unratable" and the overall rating thereof was determined as "Poor".

In Comparative example 8, the first ethylene α-olefin copolymer of the first copolymer component (a1) having an MFR as large as 8.0 g/10 minutes is compounded. As shown in Table 2, the mechanical strength of Comparative example 8 was rated as "Fail", and the overall rating thereof was therefore determined as "Poor".

In Comparative example 9, the first ethylene α-olefin copolymer of the first copolymer component (a1) having a melting point as high as 93 degrees Celsius is compounded. As shown in Table 2, the appearance of Comparative example 9 was rated as irregular, and was rated as "Fail", and the overall rating thereof was therefore determined as "Poor".

In Comparative example 10, the second ethylene α-olefin copolymer of the second copolymer component (a2) having an MFR as small as 16 g/10 minutes and a melting point as slightly low as 53 degrees Celsius is compounded. As shown in Table 2, in ordinary temperature storability, slight blocking was observed, and the ordinary temperature storability of Comparative example 10 was therefore rated as "Poor". Extrusion was difficult due to low ejection and the extrudability was therefore unratable with an electric wire. Therefore, the appearance, electrical properties, flexibility and mechanical strength of Comparative example 10 were rated as "Unratable", and the overall rating thereof was determined as "Poor".

In Comparative example 11, the first ethylene α-olefin copolymer of the second copolymer component (a2) having a melting point as very low as 50 degrees Celsius is compounded. As shown in Table 2, in ordinary temperature storability, slight blocking was observed, and the ordinary temperature storability of Comparative example 11 was therefore rated as "Poor". In addition, the extrudability was difficult to rate due to intense blocking. Therefore, the appearance, electrical properties, flexibility and mechanical strength of Comparative example 11 were rated as "Unratable" and the overall rating thereof was determined as "Poor".

The following are found from the above results. That is, when the first copolymer component (a1) of the base polymer (A) is too small in density, the mechanical strength is low, while when the first copolymer component (a1) of the base polymer (A) is too large in density, no sufficient flexibility can be achieved. Further, when the MFR is too small, the extrudability was poor, while when the MFR is too large, the mechanical strength lowers. Further, when the melting point is too high, the extrusion temperature is high, leading to appearance scorching.

Further, when the second copolymer component (a2) is too small in MFR, the ejection capacity is small, and electric wire extrusion becomes difficult, while when the second copolymer component (a2) is too low in melting point, the ordinary temperature storability is difficult. Further, when the melting point is too low, the extrusion molding temperature is high, being likely to cause scorching, and extruded appearance worsening.

For the mixed amounts of the first copolymer component (a1) and the second copolymer component (a2), when the first copolymer component (a1) is more than 90% by mass, no flexibility can be achieved, while when the first copolymer component (a1) is smaller than 50% by mass, the mechanical strength lowers.

If the added amount of the inorganic filler (B) is smaller than 80 parts by mass with respect to 100 parts by mass of the base polymer (A), the amount of carbon monoxide emission is large, while when the added amount of the inorganic filler (B) exceeds 150 parts by mass, no flexibility can be achieved. Therefore, the added amount of the inorganic filler (B) is required to be 80 to 150 parts by mass with respect to 100 parts by mass of the base polymer (A).

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A peroxide crosslinked resin composition, including:

a base polymer (A) including 50 to 90% by mass of a first copolymer component (a1) comprising one of or a mixture of two or more first ethylene α-olefin copolymers having a density of 0.864 to 0.890 g/cm$^3$, a melt flow rate (MFR) of 1 to 5 g/10 min, and a melting point of not higher than 90 degrees Celsius, and 10 to 50% by mass of a second copolymer component (a2) comprising one of or a mixture of two or more second ethylene α-olefin copolymers having a melt flow rate (MFR) of not smaller than 30 g/10 min, and a melting point of 55 to 80 degrees Celsius;

an inorganic filler (B) added in an amount of from 80 parts to 150 parts by mass with respect to 100 parts by mass of the base polymer (A); and a peroxide crosslinker (C).

2. The peroxide crosslinked resin composition according to claim 1, wherein the inorganic filler (B) comprises a mean grain diameter of 0.8 to 2.5 μm.

3. An electric wire, comprising:

a conductor; and an insulator formed around an outer periphery of the conductor by coating with the peroxide crosslinked resin composition according to claim 1.

4. A cable, comprising:

the electric wire according to claim 3.

* * * * *